United States Patent
Yoo (10) Patent No.: US 10,996,111 B2
(45) Date of Patent: May 4, 2021

(54) DISPLAY DEVICE AND DRIVING METHOD OF THE SAME

(71) Applicant: Samsung Display Co., Ltd., Yongin-si (KR)

(72) Inventor: Gi Na Yoo, Yongin-si (KR)

(73) Assignee: SAMSUNG DISPLAY CO., LTD.

( * ) Notice: Subject to any disclaimer, the term of this patent is extended or adjusted under 35 U.S.C. 154(b) by 0 days.

(21) Appl. No.: 16/746,933

(22) Filed: Jan. 19, 2020

(65) Prior Publication Data

US 2020/0284659 A1 Sep. 10, 2020

(30) Foreign Application Priority Data

Mar. 6, 2019 (KR) .................. 10-2019-0025780

(51) Int. Cl.
  *G09G 5/10* (2006.01)
  *G01J 3/50* (2006.01)
  *G09G 5/02* (2006.01)

(52) U.S. Cl.
  CPC ............... *G01J 3/506* (2013.01); *G09G 5/02* (2013.01); *G09G 5/10* (2013.01); *G09G 2320/0666* (2013.01); *G09G 2320/0693* (2013.01); *G09G 2340/06* (2013.01)

(58) Field of Classification Search
  CPC ............ G01J 3/506; G09G 2320/0271; G09G 2320/028; G09G 2320/0666; G09G 2320/068; G09G 2320/0693; G09G 2340/06; G09G 2360/16; G09G 3/3233; G09G 5/02; G09G 5/10
  See application file for complete search history.

(56) References Cited

U.S. PATENT DOCUMENTS

| 8,922,600 | B2 | 12/2014 | Moon et al. | |
| 9,552,793 | B2 | 1/2017 | Chun et al. | |
| 2009/0213300 | A1* | 8/2009 | Daiku | G02B 6/0053 349/65 |
| 2011/0080520 | A1 | 4/2011 | Tomizawa et al. | |
| 2016/0171918 | A1 | 6/2016 | Kim et al. | |
| 2018/0286324 | A1* | 10/2018 | Chen | G02F 1/1323 |

FOREIGN PATENT DOCUMENTS

| KR | 10-2014-0007583 | 1/2014 |
| KR | 10-2015-0025229 | 3/2015 |

\* cited by examiner

Primary Examiner — Insa Sadio
(74) Attorney, Agent, or Firm — H.C. Park & Associates, PLC (57) ABSTRACT

A display device and a driving method thereof. The display device includes a color controller configured to generate second image data by converting the color gamut of first image data received from the outside and to generate third image data by correcting the first image data or the second image data depending on the viewing angle variation between the first image data and the second image data, and a display panel configured to display an image based on the second image data or the third image data.

20 Claims, 8 Drawing Sheets

DISPLAY DEVICE AND DRIVING METHOD OF THE SAME

CROSS-REFERENCE TO RELATED APPLICATION

This application claims priority from and the benefit of Korean Patent Application No. 10-2019-0025780, filed on Mar. 6, 2019, which is hereby incorporated by reference for all purposes as if fully set forth herein.

BACKGROUND

Field

Exemplary embodiments of the invention relate generally to a display device and a driving method thereof.

Discussion of the Background

A display device realizes primary colors using light-emitting elements, which are spatially distributed in the display panel thereof and typically configured to emit light with colors of red, green, and blue. The display device mixes the primary colors and adjusts the chromaticity and luminance thereof, thereby displaying an image including mixed colors.

A representable color gamut formed by a display device is generally defined using a triangle that connects the chromaticity coordinates of three primary colors of red, green, and blue on a two-dimensional CIE-xy chromaticity chart. A display device using the three primary colors of red, green, and blue may perform color compensation for image data through color gamut conversion, which is the process of mapping a first color gamut to a second color gamut.

In a display device, color may change with the angle at which a user views the display panel of the display device because of the structure and process variation of light-emitting elements. That is, when a user views an image in a direction other than from a front direction, the color represented in the display panel may be recognized as being different from the color recognized when the user views the image in front of the display panel. Particularly, when color compensation is implemented through color mapping, as described above, even though a color gamut is reduced, a viewing angle for a specific color may be decreased.

The above information disclosed in this Background section is only for understanding of the background of the inventive concepts, and, therefore, it may contain information that does not constitute prior art.

SUMMARY

Exemplary embodiments of the invention provide a display device and a driving method thereof, through which a viewing angle that is decreased by converting a color gamut may be improved.

Exemplary embodiments of the invention also provide a display device and a driving method thereof, in which the viewing angle of image data, the color gamut of which is converted, is determined using information about the previously measured viewing angles of primary colors and in which the image data is corrected based on the hue variation when a decrease in the viewing angle, caused due to color gamut conversion, is equal to or greater than a threshold value.

Additional features of the inventive concepts will be set forth in the description which follows, and in part will be apparent from the description, or may be learned by practice of the inventive concepts.

An exemplary embodiment of the invention provides a display device including a color controller configured to generate second image data by converting the color gamut of first image data received from the outside and to generate third image data by correcting the first image data or the second image data depending on the viewing angle variation between the first image data and the second image data; and a display panel configured to display an image based on the second image data or the third image data.

The color controller may determine a first viewing angle of the first image data and a second viewing angle of the second image data based on primary-color-viewing-angle data and determine the viewing angle variation based on the difference between the first viewing angle and the second viewing angle. Here, the primary-color-viewing-angle data may include the chromaticity coordinates of each of multiple primary colors for the display panel in a first viewing direction and the chromaticity coordinates thereof in a second viewing direction.

The color controller may determine first chromaticity coordinates of a color corresponding to arbitrary image data in the first viewing direction and second chromaticity coordinates thereof in the second viewing direction based on the primary-color-viewing-angle data and determine the viewing angle of the image data based on the difference between the first chromaticity coordinates and the second chromaticity coordinates.

The color controller may determine the first chromaticity coordinates in the first viewing direction and the second chromaticity coordinates in the second viewing direction based on the primary-color-viewing-angle data using a preset conversion equation.

The first viewing direction may be a direction to face a measuring point on the display panel, and the second viewing direction may be a tilted direction from the first viewing direction with reference to the measuring point.

The color controller may generate the third image data by correcting the first image data when the viewing angle variation is less than a first threshold value.

The color controller may generate the third image data by correcting the chromaticity coordinates of the first image data or the second image data such that the hue of the first image data and the hue of the third image data are equal to or less than a second threshold value.

The color controller may determine whether it is necessary to correct image data based on previously stored color group information, and the color group information may include information about at least one color, of which a viewing angle variation caused by converting a color gamut is less than a first threshold value.

The color controller may generate the third image data by correcting the first image data or the second image data when a color corresponding to the first image data is included in the color group information.

The display panel may display the image based on the second image data when the third image data is not generated by the color controller, and may display the image based on the third image data when the third image data is generated by the color controller.

Another exemplary embodiment of the invention provides a driving method of a display device, including generating second image data by converting the color gamut of first image data received from the outside; determining whether image data correction is required depending on the viewing angle variation between the first image data and the second image data; generating third image data by correcting the first image data or the second image data depending on the result of determination; and displaying an image based on the second image data or the third image data.

Determining whether the image data correction is required may include determining a first viewing angle of the first image data and a second viewing angle of the second image data based on primary-color-viewing-angle data; and determining the viewing angle variation based on the difference between the first viewing angle and the second viewing angle. Here, the primary-color-viewing-angle data may include the chromaticity coordinates of each of multiple primary colors for a display panel in a first viewing direction and the chromaticity coordinates thereof in a second viewing direction.

Determining the first viewing angle and the second viewing angle may include determining first chromaticity coordinates of a color corresponding to the first image data in the first viewing direction and second chromaticity coordinates thereof in the second viewing direction based on the primary-color-viewing-angle data; determining the viewing angle of the first image data based on the difference between the first chromaticity coordinates and the second chromaticity coordinates; determining third chromaticity coordinates of a color corresponding to the second image data in the first viewing direction and fourth chromaticity coordinates thereof in the second viewing direction based on the primary-color-viewing-angle data; and determining the viewing angle of the second image data based on the difference between the third chromaticity coordinates and the fourth chromaticity coordinates.

The first to fourth chromaticity coordinates may be determined based on the primary-color-viewing-angle data using a preset conversion equation.

The first viewing direction may be a direction to face a measuring point on the display panel, and the second viewing direction may be a tilted direction from the first viewing direction with reference to the measuring point.

Generating the third image data may include comparing the viewing angle variation with a first threshold value; and generating the third image data by correcting the first image data when the viewing angle variation is less than the first threshold value.

Generating the third image data may include correcting the chromaticity coordinates of the first image data or the second image data such that the hue of the first image data and the hue of the third image data are equal to or less than a second threshold value.

Determining whether the image data correction is required may include determining whether a color corresponding to the first image data is included in previously stored color group information; and determining that the image data correction is required when the color corresponding to the first image data is included in the previously stored color group information.

The color group information may include information about at least one color, of which the viewing angle variation caused by converting a color gamut is less than a first threshold value.

Displaying the image may include displaying the image based on the second image data when the third image data is not generated; and displaying the image based on the third image data when the third image data is generated.

At least one of the first, second and third controllers may include a first driving controller, a second driving controller, and a connection controller, respectively.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate exemplary embodiments of the invention, and together with the description serve to explain the inventive concepts.

DETAILED DESCRIPTION

In the following description, for the purposes of explanation, numerous specific details are set forth in order to provide a thorough understanding of various exemplary embodiments or implementations of the invention. As used herein "embodiments" are non-limiting examples of devices or methods employing one or more of the inventive concepts disclosed herein. It is apparent, however, that various exemplary embodiments may be practiced without these specific details or with one or more equivalent arrangements. In other instances, well-known structures and devices are shown in block diagram form in order to avoid unnecessarily obscuring various exemplary embodiments. Further, various exemplary embodiments may be different, but do not have to be exclusive. For example, specific shapes, configurations, and characteristics of an exemplary embodiment may be used or implemented in another exemplary embodiment without departing from the inventive concepts.

Unless otherwise specified, the illustrated exemplary embodiments are to be understood as providing exemplary features of varying detail of some ways in which the inventive concepts may be implemented in practice. Therefore, unless otherwise specified, the features, components, modules, layers, films, panels, regions, and/or aspects, etc. (hereinafter individually or collectively referred to as "elements"), of the various embodiments may be otherwise combined, separated, interchanged, and/or rearranged without departing from the inventive concepts.

In the accompanying drawings, the size and relative sizes of elements may be exaggerated for clarity and/or descriptive purposes. When an exemplary embodiment may be implemented differently, a specific process order may be performed differently from the described order. For example, two consecutively described processes may be performed substantially at the same time or performed in an order opposite to the described order. Also, like reference numerals denote like elements.

When an element, such as a layer, is referred to as being "on," "connected to," or "coupled to" another element or layer, it may be directly on, connected to, or coupled to the other element or layer or intervening elements or layers may be present. When, however, an element or layer is referred to as being "directly on," "directly connected to," or "directly coupled to" another element or layer, there are no intervening elements or layers present. To this end, the term "connected" may refer to physical, electrical, and/or fluid connection, with or without intervening elements. Further, the D1-axis, the D2-axis, and the D3-axis are not limited to three axes of a rectangular coordinate system, such as the x, y, and z-axes, and may be interpreted in a broader sense. For example, the D1-axis, the D2-axis, and the D3-axis may be perpendicular to one another, or may represent different directions that are not perpendicular to one another. For the purposes of this disclosure, "at least one of X, Y, and Z" and "at least one selected from the group consisting of X, Y, and Z" may be construed as X only, Y only, Z only, or any combination of two or more of X, Y, and Z, such as, for instance, XYZ, XYY, YZ, and ZZ. As used herein, the term "and/or" includes any and all combinations of one or more of the associated listed items.

Although the terms "first," "second," etc. may be used herein to describe various types of elements, these elements should not be limited by these terms. These terms are used to distinguish one element from another element. Thus, a first element discussed below could be termed a second element without departing from the teachings of the disclosure.

Spatially relative terms, such as "beneath," "below," "under," "lower," "above," "upper," "over," "higher," "side" (e.g., as in "sidewall"), and the like, may be used herein for descriptive purposes, and, thereby, to describe one elements relationship to another element(s) as illustrated in the drawings. Spatially relative terms are intended to encompass different orientations of an apparatus in use, operation, and/or manufacture in addition to the orientation depicted in the drawings. For example, if the apparatus in the drawings is turned over, elements described as "below" or "beneath" other elements or features would then be oriented "above" the other elements or features. Thus, the exemplary term "below" can encompass both an orientation of above and below. Furthermore, the apparatus may be otherwise oriented (e.g., rotated 90 degrees or at other orientations), and, as such, the spatially relative descriptors used herein interpreted accordingly.

The terminology used herein is for the purpose of describing particular embodiments and is not intended to be limiting. As used herein, the singular forms, "a," "an," and "the" are intended to include the plural forms as well, unless the context clearly indicates otherwise. Moreover, the terms "comprises," "comprising," "includes," and/or "including," when used in this specification, specify the presence of stated features, integers, steps, operations, elements, components, and/or groups thereof, but do not preclude the presence or addition of one or more other features, integers, steps, operations, elements, components, and/or groups thereof. It is also noted that, as used herein, the terms "substantially," "about," and other similar terms, are used as terms of approximation and not as terms of degree, and, as such, are utilized to account for inherent deviations in measured, calculated, and/or provided values that would be recognized by one of ordinary skill in the art.

As is customary in the field, some exemplary embodiments are described and illustrated in the accompanying drawings in terms of functional blocks, units, and/or modules. Those skilled in the art will appreciate that these blocks, units, and/or modules are physically implemented by electronic (or optical) circuits, such as logic circuits, discrete components, microprocessors, hard-wired circuits, memory elements, wiring connections, and the like, which may be formed using semiconductor-based fabrication techniques or other manufacturing technologies. In the case of the blocks, units, and/or modules being implemented by microprocessors or other similar hardware, they may be programmed and controlled using software (e.g., microcode) to perform various functions discussed herein and may optionally be driven by firmware and/or software. It is also contemplated that each block, unit, and/or module may be implemented by dedicated hardware, or as a combination of dedicated hardware to perform some functions and a processor (e.g., one or more programmed microprocessors and associated circuitry) to perform other functions. Also, each block, unit, and/or module of some exemplary embodiments may be physically separated into two or more interacting and discrete blocks, units, and/or modules without departing from the scope of the inventive concepts. Further, the blocks, units, and/or modules of some exemplary embodiments may be physically combined into more complex blocks, units, and/or modules without departing from the scope of the inventive concepts.

Unless otherwise defined, all terms (including technical and scientific terms) used herein have the same meaning as commonly understood by one of ordinary skill in the art to which this disclosure is a part. Terms, such as those defined in commonly used dictionaries, should be interpreted as having a meaning that is consistent with their meaning in the context of the relevant art and should not be interpreted in an idealized or overly formal sense, unless expressly so defined herein.

Figure 1:
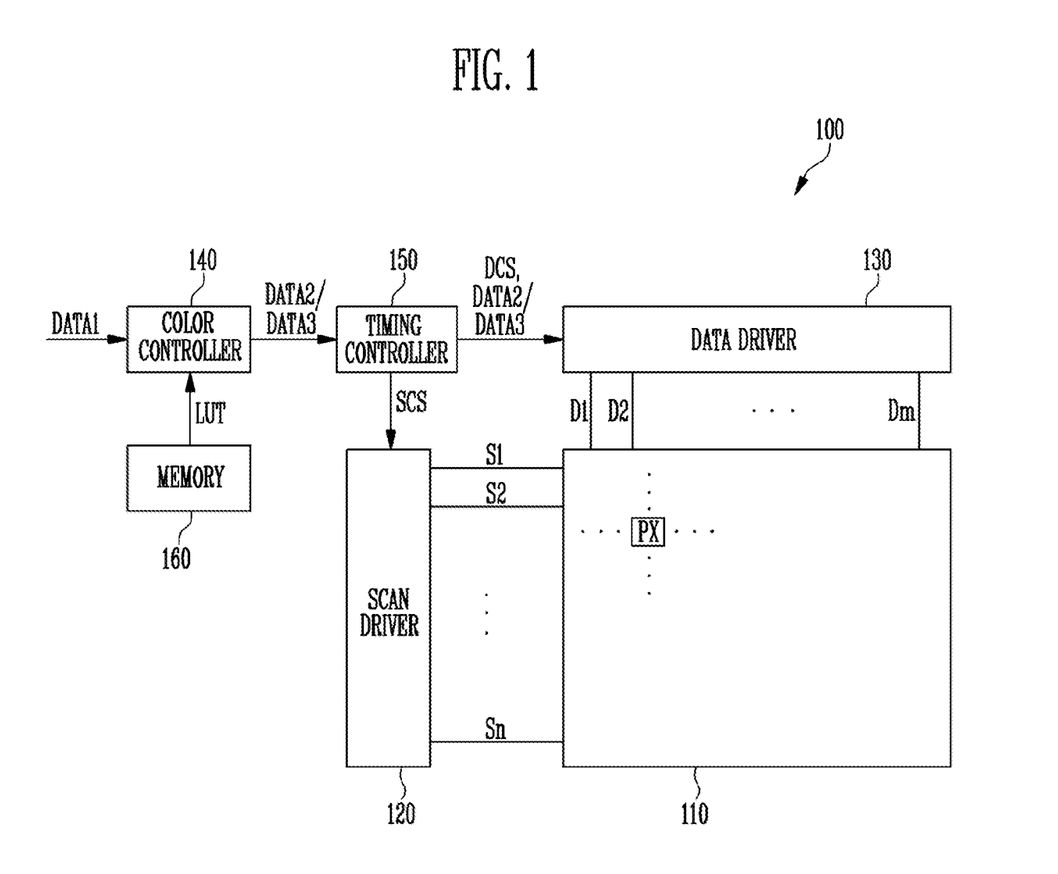
FIG. 1 is a block diagram illustrating a display device according to an exemplary embodiment of the invention.
Figure 2A:
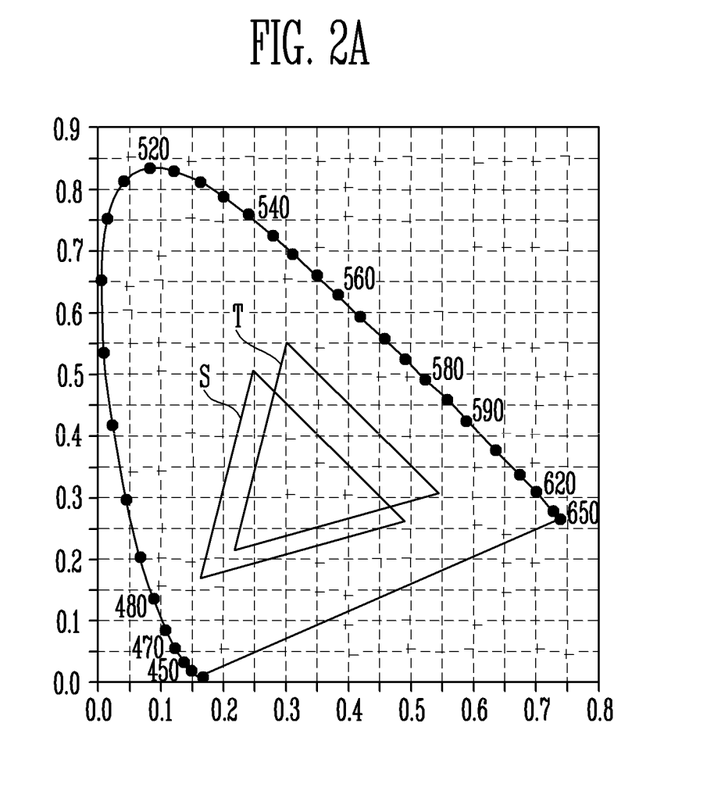
FIGS. 2A and 2B are views for explaining color gamut conversion according to an exemplary embodiment of the invention.
Figure 2B:
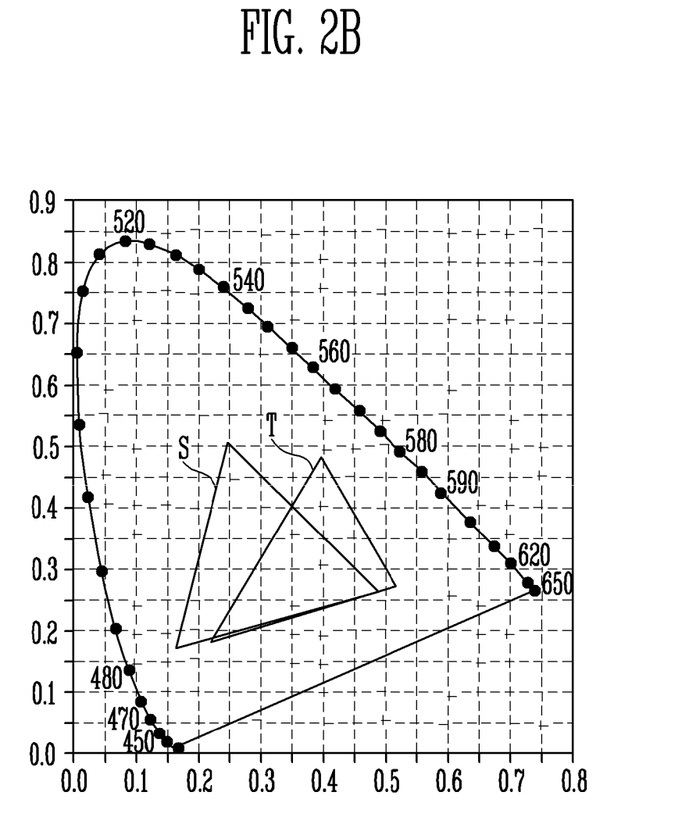

FIG. 1 is a block diagram illustrating a display device according to an exemplary embodiment of the invention, and FIGS. 2A and 2B are views for explaining color gamut conversion according to the inventive concepts.

Referring to FIG. 1, a display device 100 according to an exemplary embodiment of the invention may include a display panel 110, a scan driver 120, a data driver 130, a timing controller 150, a color controller 140, and a memory 160. The display device 100 may be a device for displaying an image based on image data provided from the outside (for example, based on first image data DATA1). For example, the display device 100 may be an organic light-emitting display device.

The display panel 110 may include multiple scan lines S1 to Sn, multiple data lines D1 to Dm, and multiple pixels PX (or subpixels). Here, each of n and m may be an integer equal to or greater than 2.

The pixels PX may be disposed at points at which the scan lines S1 to Sn intersect with the data lines D1 to Dm. Each of the pixels PX may emit light based on a scan signal supplied to the scan lines S1 to Sn and on a data signal supplied to the data lines D1 to Dm. The configuration of the pixel PX will be described with reference to FIG. 3.

The scan driver 120 may generate a first scan signal and a second scan signal based on a scan driving control signal SCS. That is, the scan driver 120 may supply scan signals to pixels PX via the scan lines S1 to Sn during a display period.

The scan driving control signal SCS may be supplied from the timing controller 150 to the scan driver 120. The scan driving control signal SCS may include a start pulse and clock signals. The scan driver 120 may include a shift register, which sequentially generates scan signals in response to the start pulse and the clock signals.

The data driver 130 may generate a data signal based on a data driving control signal DCS and image data (i.e., second image data DATA2 or third image data DATA3). The data driver 130 may supply the display panel 110 with a data signal generated depending on the data driving control signal DCS during the display period within a frame. That is, the data driver 130 may supply data signals to the pixels PX via the data lines D1 to Dm. The data driving control signal DCS may be supplied from the timing controller 150 to the data driver 130.

The color controller 140 may set a target color gamut T for input image data (i.e., first image data DATA1). Here, the color gamut may be defined by multiple lattice points in a 2D chromaticity coordinate system. For example, the range of a color gamut may be defined by lattice points including a red point R, a green point G, a blue point B, a cyan point P, a magenta point M, a yellow point Y, and a white point W. A combination of these lattice points may generally form a triangular area.

Each of the lattice points may be defined using coordinate values, and the coordinate values may include an x-coordinate value and a y-coordinate value. Here, in response to the x-coordinate value and the y-coordinate value of a lattice point, the values of the red component, the green component, and the blue component of image data, that is, the color of image data, may be determined.

The color controller 140 according to the invention may convert image data (i.e., first image data DATA1), received via the timing controller 150 or received directly from an external host device, into image data (i.e., second image data) in a target color gamut T using a color gamut look up table (LUT), which defines the target color gamut T. As illustrated in FIG. 2A, the target color gamut T may be formed in such a way that lattice points in the color gamut of input image data (hereinafter, referred to as a source color gamut S) are shifted by the same vector in the 2D chromaticity coordinate system. Alternatively, as illustrated in FIG. 2B, the target color gamut T may be formed in such a way that lattice points in the source color gamut S are shifted by different vectors in the 2D chromaticity coordinate system.

The color gamut LUT may include mapping information in which multiple lattice points defining a source color gamut in a 2D chromaticity coordinate system are mapped to multiple lattice points defining a target color gamut T. The color controller 140 loads the x-coordinate value and the y-coordinate value in the target color gamut T, corresponding to the x-coordinate value and the y-coordinate value of image data, from the color gamut LUT, thereby performing color gamut conversion for the input image data.

The input image data is converted into image data in the target color gamut T, whereby the source color gamut S may be converted into the target color gamut T. Here, the input image data is converted into image data in the target color gamut T, whereby the viewing angle for the input image data may be changed.

In exemplary embodiments of the invention, the viewing angle may be defined as the variation between chromaticity coordinates in a first viewing direction and a second viewing direction of the display panel 110. Here, the first viewing direction is from a front direction to face the display panel 110 (along a line perpendicular to the display panel 110), and the second viewing direction may be a direction at 45 degrees (45 degrees to the line perpendicular to the display panel 110). However, the definition of the viewing angle is not limited to the above description in the invention.

In exemplary embodiments of the invention, the color controller 140 may determine the viewing angle variation by comparing the viewing angle of the input image data with that of the image data, the color gamut of which is converted, (i.e., the viewing angle of the second image data DATA2). In exemplary embodiments of the invention, the color controller 140 may determine the viewing angle of the input image data and that of the image data, the color gamut of which is converted, using the primary-color-viewing-angle data.

The primary-color-viewing-angle data may include chromaticity coordinates (i.e., an x-coordinate value and a y-coordinate value) of multiple primary colors, which are implemented by light-emitting elements in the pixels PX, in the first viewing direction and chromaticity coordinates and luminance thereof in the second viewing direction. Here, the first viewing direction is from a front direction to face the display panel 110, and the second viewing direction is at 45 degrees to the front direction. Depending on the variation between the chromaticity coordinates in the first viewing direction and the second viewing direction, the viewing angle for a corresponding primary color may be determined. The color controller 140 may determine a viewing angle for the input image data including a mixed color based on the primary-color-viewing angle data using a preset conversion equation.

A method for generating primary-color-viewing-angle data will be described in detail with reference to FIG. 4.

In an exemplary embodiment, when the viewing angle variation is greater than (or is equal to or greater than) a preset threshold value, the color controller 140 may output the image data, the color gamut of which is converted. Conversely, when the viewing angle variation is equal to or less than (or is less than) the preset threshold value (that is, when the viewing angle is decreased through color gamut conversion), the color controller 140 may correct the image data in order to improve the viewing angle, and may output the corrected image data (i.e., third image data DATA3). In an exemplary embodiment, the color controller 140 may correct the input image data such that the hue variation between the input image data and the corrected image data is equal to or less than (or is less than) a preset threshold value.

A color control method of the color controller 140 will be described below with reference to FIGS. 5 to 8.

The timing controller 150 may control the operation of the scan driver 120 and the data driver 130. The timing controller 150 may generate a scan driving control signal SCS and a data driving control signal DCS, and may control each of the scan driver 120 and the data driver 130 based on the generated signals.

In exemplary embodiments of the invention, the timing controller 150 may transmit the image data output from the color controller 140 (i.e., the second image data DATA2 or the third image data DATA3) to the data driver 130 along with the data driving control signal DCS. Then, the image data may be converted into a data signal by the data driver 130, and may then be supplied to the display panel 110.

The memory 160 may store data that is necessary in order to drive the display device 100. For example, the memory 160 may store a color gamut LUT, which defines the above-described target color gamut T. The color gamut LUT may be stored in the memory 160 by being configured in advance when the display device 100 is manufactured, or may be received from an external host device or the like.

In exemplary embodiments of the invention, the memory 160 may store the above-described primary-color-viewing-angle data. The primary-color-viewing-angle data may be stored in the memory 160 by being set through a test when the display device 100 is manufactured, or may be received from an external host device or the like.

When the viewing angle for the input image data or for the image data, the color gamut of which is converted, is determined in real time for color control according to the invention, the above-described primary-color-viewing-angle data may be stored in the memory 160. However, in an exemplary embodiment in which it is not necessary to determine the viewing angle because the viewing angle for the input image data is already determined to be decreased, information about a group of colors that need to be corrected may be stored in the memory 160, rather than the primary-color-viewing-angle data. This information may include chromaticity coordinates and/or a red value, a green value, and a blue value for a color that needs to be corrected because the viewing angle thereof is decreased through color gamut conversion.

The color controller 140 is illustrated as a separate component in FIG. 1, but inventive concepts are not limited thereto. That is, in exemplary embodiments, the color controller 140 may be mounted in the timing controller 150, or may be combined with the timing controller 150 so as to form a single controller. In such an exemplary embodiment, the color control operation of the color controller 140, which will be described later, may be performed by the timing controller 150.

Hereinbelow, a color control method according to the invention will be described as being performed by the color controller 140 (or the timing controller 150) of the display device 100, but the inventive concepts are not limited thereto. That is, in exemplary embodiments, the color control method according to the invention may be performed by memory arranged outside the display device 100 or through Auto Visual Inspection (AVI).

Figure 3:
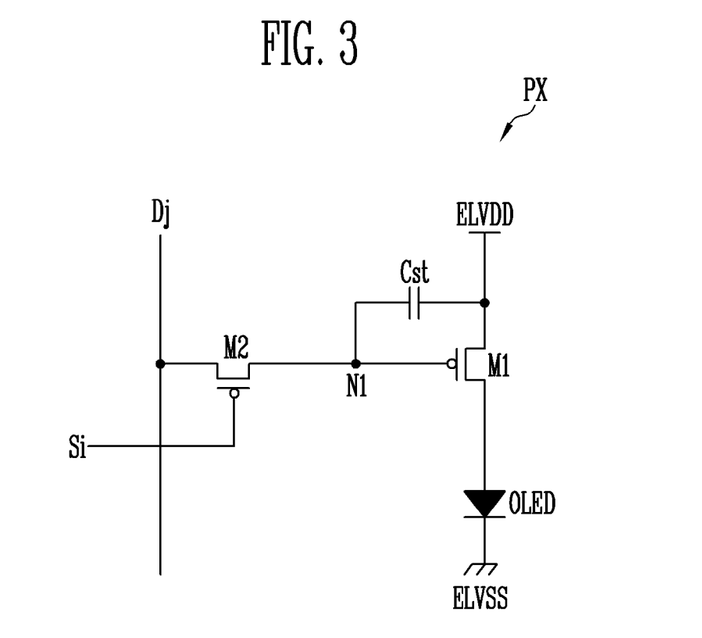
FIG. 3 is a circuit diagram illustrating an example of the pixel illustrated in FIG.

FIG. 3 is a circuit diagram illustrating an example of the pixel illustrated in FIG. 1. For the convenience of description, FIG. 3 illustrates an example of the pixel PX that is coupled to the i-th scan line Si and the j-th data line Dj.

Referring to FIG. 3, the pixel PX may include a first transistor M1, a second transistor M2, a storage capacitor Cst, and a light-emitting element OLED.

The first transistor (driving transistor) M1 may include a first electrode coupled to a first driving power source ELVDD, a second electrode coupled to the light-emitting element OLED, and a gate electrode coupled to a first node N1. The first transistor M1 may control the amount of current flowing in the light-emitting element OLED in response to the gate-source voltage.

The second transistor (switching transistor) M2 may include a first electrode coupled to the data line Dj, a gate electrode coupled to the scan line Si, and a second electrode coupled to the first node N1. The second transistor M2 is turned on when an scan signal is supplied via the scan line Si, thereby supplying a data signal from the data line Dj to the storage capacitor Cst or controlling the electric potential of the first node N1. Here, the storage capacitor Cst coupled between the first node N1 and the first electrode of the first transistor M1 may charge the voltage corresponding to the data signal.

The light-emitting element OLED may include a first electrode (i.e., anode electrode) coupled to the second electrode of the first transistor M1 and a second electrode (i.e., cathode electrode) coupled to a second driving power source ELVSS. The light-emitting element OLED may generate light corresponding to the amount of current supplied from the first transistor M1. In exemplary embodiments, the light-emitting element OLED may generate light corresponding to any one of red, green and blue.

In FIG. 3, the first electrode of each of the transistors M1 and M2 may be set as one of a source electrode or a drain electrode, and the second electrode thereof may be set as the other one of the source electrode or the drain electrode. For example, when the first electrode is set as a source electrode, the second electrode may be set as a drain electrode.

Also, the transistors M1 and M2 may be PMOS transistors, as illustrated in FIG. 3. However, the inventive concepts are not limited to this example, and the transistors M1 and M2 may be implemented as NMOS transistors. In such an exemplary embodiment, the circuit of the pixel PX may be variously changed so as to be suitable to operate the NMOS transistors.

Figure 4:
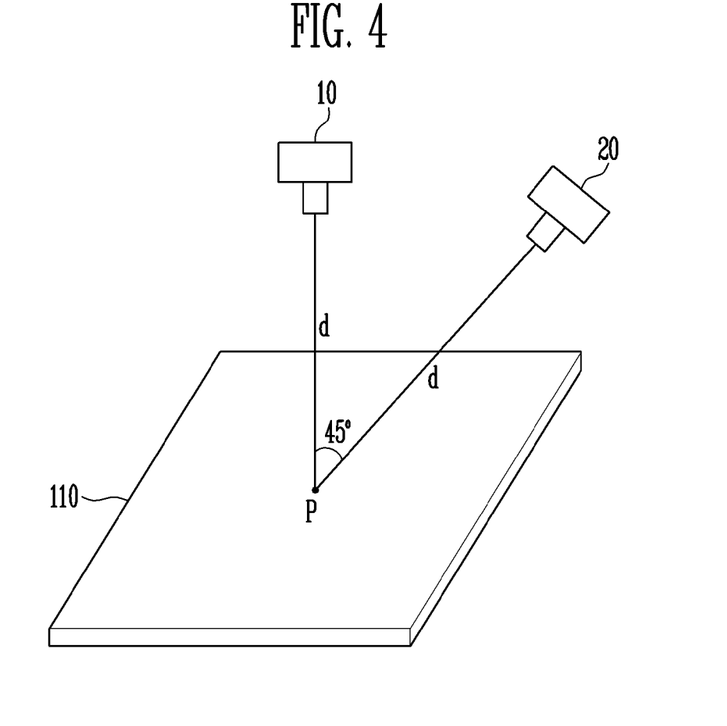
FIG. 4 is a view for explaining a method for generating primary-color-viewing-angle data.

FIG. 4 is a view for explaining a method for generating primary-color-viewing-angle data.

Referring to FIG. 4 and FIG. 1, in exemplary embodiments, the color controller 140 may determine the viewing angle of input image data (i.e., first image data DATA1) and the viewing angle of image data, the color gamut of which is converted, (i.e., second image data DATA2) using primary-color-viewing-angle data, as described above.

The primary-color-viewing-angle data may include chromaticity coordinates (i.e., an x-coordinate value and a y-coordinate value) of multiple primary colors, implemented by light-emitting elements in the pixels PX, in the first viewing direction and chromaticity coordinates and luminance thereof in the second viewing direction. Here, the first viewing direction is a direction to face a measuring point P on the display panel 110, and the second viewing direction is a tilted direction (e.g. at 45 degrees) from the first viewing direction with reference to the measuring point P. Such primary-color-viewing-angle data may be generated as described below.

First, a first measuring instrument 10 and a second measuring instrument 20 are disposed at the same distance d from any measuring point P on the display panel 110. The first measuring instrument 10 may be disposed in the first viewing direction to face the display panel 110, for example, along a line perpendicular to the display panel 110 (that is, at 0 degrees to the line perpendicular to the display panel 110), and the second measuring instrument 20 may be disposed in the second viewing direction of the display panel 110, for example, at 45 degrees to the line perpendicular to the display panel 110.

Each of the first measuring instrument 10 and the second measuring instrument 20 may measure the red value, the green value, and the blue value of light received at its position while the display panel 110 is emitting light having an arbitrary primary color. The red value, the green value, and the blue value measured by each of the first measuring instrument 10 and the second measuring instrument 20 may be converted into chromaticity coordinates. For example, the red value, the green value, and the blue value measured by each of the first measuring instrument 10 and the second measuring instrument 20 may be converted into an x-coordinate value and a y-coordinate value based on a preset conversion equation.

Additionally, the first measuring instrument 10 and the second measuring instrument 20 may further measure the luminance of light received in the first viewing direction and in the second viewing direction. The luminance measured in the first viewing direction and the luminance measured in the second viewing direction may be converted into a value indicative of the luminance in the second viewing direction relative to the luminance in the first viewing direction, that is, a luminance ratio (L45/L0).

As described above, primary-color-viewing-angle data for an arbitrary primary color, which includes the chromaticity coordinates of the corresponding primary color measured in the first viewing direction and the chromaticity coordinates thereof measured in the second viewing direction, may be generated. The following Table 1 shows an example of the primary-color-viewing-angle data generated as described above. Table 1 shows an example of primary-color-viewing-angle data, including the chromaticity coordinates in the first viewing direction, the chromaticity coordinates in the second viewing direction, and the luminance ratio (L45/L0) for three primary colors, which are red, green and blue. Also, the primary-color-viewing-angle data in Table 1 additionally includes the chromaticity coordinates of a white color in the first viewing direction.

TABLE 1

| | first viewing direction (0 degrees) | | second viewing direction (45 degrees) | | |
|---|---|---|---|---|---|
| | x | y | L45/L0 | x | y |
| red (R) | 0.684 | 0.314 | 0.463 | 0.667 | 0.331 |
| green (G) | 0.237 | 0.715 | 0.431 | 0.198 | 0.708 |
| blue (B) | 0.145 | 0.040 | 0.340 | 0.151 | 0.035 |
| white (W) | 0.298 | 0.318 | | | |

The primary-color-viewing-angle data generated as described above may be stored in the memory 160 of the display device 100. Alternatively, the primary-color-viewing-angle data may be stored in separate memory or an AVI system disposed outside the display device 100.

When the primary-color-viewing-angle data is generated, the viewing angle for the corresponding primary color may be determined depending on a change in the chromaticity coordinates in the first viewing direction and the second viewing direction. Also, the viewing angle for a mixed color, which is configured as the mixture of primary colors, may be calculated from the primary-color-viewing-angle data using a preset conversion equation.

In the above description, the first measuring instrument 10 and the second measuring instrument 20 are described as measuring the red value, the green value, and the blue value of light in different directions, but the inventive concepts are not limited thereto. That is, in exemplary embodiments, a single measuring instrument may measure the red value, the green value, and the blue value of light in the first viewing direction and then measure the red value, the green value, and the blue value of light in the second viewing direction by moving to the measuring point for the second viewing direction.

Hereinafter, the method for performing color control using the primary-color-viewing-angle data, which is generated as described above, will be described in detail.

Figure 5:
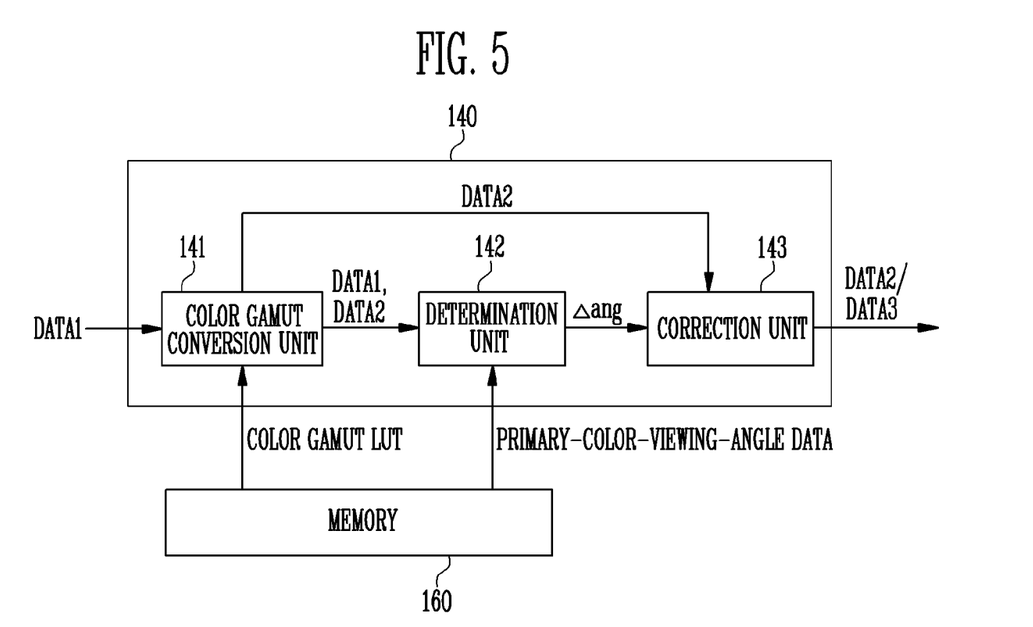
FIG. 5 is a block diagram illustrating the configuration of a color controller according to a first exemplary embodiment of the invention.

FIG. 5 is a block diagram illustrating the configuration of a color controller according to a first exemplary embodiment of the invention.

Referring to FIG. 5, the color controller 140 according to the first exemplary embodiment of the invention may include a color gamut conversion unit 141, a determination unit 142, and a correction unit 143.

The color gamut conversion unit 141 may receive first image data DATA1 from an external host device or via the timing controller 150. The first image data DATA1 may include a red value, a green value, and a blue value corresponding to a required color. The first image data may include chromaticity coordinates, that is, an x-coordinate value and a y-coordinate value, corresponding to the required color. In exemplary embodiments, when the first image data DATA1 includes only a red value, a green value, and a blue value, the color gamut conversion unit 141 may convert the red value, the green value, and the blue value into chromaticity coordinates.

As described above with reference to FIG. 1 and FIGS. 2A and 2B, the color gamut conversion unit 141 may convert the first image data DATA1, which is generated based on a source color gamut S, into second image data DATA2 in a target color gamut T. In exemplary embodiments, each of the source color gamut S and the target color gamut T of the first image data DATA1 may be any one of sRGB, scRGB, xvYCC, YCbCr, CIELAB, CIE-XYZ, and the like.

In exemplary embodiments, the color gamut conversion unit 141 may load chromaticity coordinates mapped to the chromaticity coordinates of the first image data DATA1 from a color gamut LUT stored in the memory 160 or the like and generate second image data DATA2 based on the loaded chromaticity coordinates. In exemplary embodiments, the color gamut conversion unit 141 may generate second image data DATA2 by converting the loaded chromaticity coordinates into a red value, a green value, and a blue value.

The determination unit 142 may determine the viewing angle variation (Δang) between the first image data DATA1 and the second image data DATA2.

Specifically, the determination unit 142 may determine the viewing angles of the first image data DATA1 and the second image data DATA2. In exemplary embodiments, the determination unit 142 may determine the viewing angles of the first image data DATA1 and the second image data DATA2 using the primary-color-viewing-angle data, which was described with reference to FIG. 4.

More specifically, the determination unit 142 may determine the chromaticity coordinates of the first image data DATA1 in the first viewing direction and the second viewing direction and the chromaticity coordinates of the second image data DATA2 in the first viewing direction and the second viewing direction with reference to the primary-color-viewing-angle data. The determination unit 142 compares the chromaticity coordinates of the first image data DATA1 in the first viewing direction with those in the second viewing direction, thereby determining a change in the chromaticity coordinates (Δu'v'_45) of the first image data DATA1. Also, the determination unit 142 compares the chromaticity coordinates of the second image data DATA2 in the first viewing direction with those in the second viewing direction, thereby determining a change in the chromaticity coordinates (Δu'v'_45) of the second image data DATA2.

In such an exemplary embodiment, the viewing angles of the first image data DATA1 and the second image data DATA2 may correspond to the change in the chromaticity coordinates (Δu'v'_45).

Also, the determination unit 142 may determine the viewing angle variation (Δang) from the determined viewing angle of the first image data DATA1 and that of the second image data DATA2. For example, the determination unit 142 compares the change in the chromaticity coordinates (Δu'v'_45) of the first image data DATA1 with the change in the chromaticity coordinates (Δu'v'_45) of the second image data DATA2, thereby determining the viewing angle variation (Δang). Here, the viewing angle variation (Δang) may represent whether the viewing angle of the second image data DATA2 is increased or decreased, compared to the viewing angle of the first image data DATA1, and the degrees by which the viewing angle is increased or decreased.

The following Table 2 shows an example of changes in the chromaticity coordinates ($\Delta u'v'\_45$) of some colors of the first image data DATA1 and the viewing angle variation ($\Delta ang$). In Table 2, the red values R, the green values G, and the blue values B of the colors before and after color gamut conversion, changes in the chromaticity coordinates ($\Delta u'v'\_45$), and the viewing angle variation ($\Delta ang$) are illustrated.

TABLE 2

|  | DATA1 | | | | DATA2 | | | | |
| --- | --- | --- | --- | --- | --- | --- | --- | --- | --- |
|  | R | G | B | $\Delta u'v'\_45$ | R | G | B | $\Delta u'v'\_45$ | $\Delta ang$ |
| 1st color | 115 | 82 | 68 | 0.0136 | 112 | 83 | 67 | 0.0134 | 0.0002 |
| 2nd color | 80 | 91 | 166 | 0.0080 | 86 | 94 | 154 | 0.0092 | −0.0012 |
| 3rd color | 214 | 126 | 44 | 0.0190 | 204 | 131 | 61 | 0.0173 | 0.0017 |
| 4th color | 56 | 61 | 150 | 0.0053 | 60 | 66 | 138 | 0.0067 | −0.0014 |

Referring to Table 2, the viewing angles of the first color and the third color increase after color gamut conversion, but the viewing angles of the second color and the fourth color decrease after color gamut conversion. That is, the viewing angle variation ($\Delta ang$) of the first and third colors is a positive value, but the viewing angle variation ($\Delta ang$) of the second and fourth colors is a negative value.

In the present exemplary embodiment, color compensation is performed in order to improve a viewing angle for a color, the viewing angle of which decreases after color gamut conversion, like the second and fourth colors.

The correction unit 143 may determine whether the viewing angle variation ($\Delta ang$), determined by the determination unit 142, is greater than (or is equal to or greater than) a preset threshold value or equal to or less than (or less than) the preset threshold value. When the viewing angle variation ($\Delta ang$) is equal to or greater than (or is greater than) the preset threshold value; that is, when the viewing angle increases after color gamut conversion or when the viewing angle decreases after color gamut conversion but the viewing angle variation is not less than the threshold value, the correction unit 143 may output the second image data DATA2 generated by the color gamut conversion unit 141.

When the viewing angle variation ($\Delta ang$) is less than (or is equal to or less than) the preset threshold value; that is, when the viewing angle decreases after color gamut conversion, the correction unit 143 may generate third image data DATA3 by correcting the first image data DATA1 or the second image data DATA2. In an exemplary embodiment, the correction unit 143 may change at least one of the red value, the green value, and the blue value of the first image data DATA1 or the second image data DATA2 such that the hue variation ($\Delta HUE$) between the hue of the first image data DATA1 and the hue of the third image data DATA3 is equal to or less than a preset threshold value.

An example of third image data DATA3, which is generated through correction in response to the exemplary embodiment in Table 2, is illustrated in the following Table 3:

TABLE 3

|  | DATA1 | | | | DATA2 | | | | DATA3 | | | | |
| --- | --- | --- | --- | --- | --- | --- | --- | --- | --- | --- | --- | --- | --- |
|  | R | G | B | $\Delta u'v'\_45$ | R | G | B | $\Delta u'v'\_45$ | R | G | B | $\Delta u'v'\_45$ | $\Delta HUE$ |
| 2nd color | 80 | 91 | 166 | 0.0080 | 86 | 94 | 154 | 0.0092 | 84 | 92 | 157 | 0.0088 | 0.57 |
| 4th color | 56 | 61 | 150 | 0.0053 | 60 | 66 | 138 | 0.0067 | 58 | 64 | 140 | 0.0062 | 0.26 |

The correction unit 143 may output the generated third image data DATA3. In exemplary embodiments, the second image data DATA2 or the third image data DATA3 output from the correction unit 143 may be transmitted to the timing controller 150 or the data driver 130.

Figure 6:
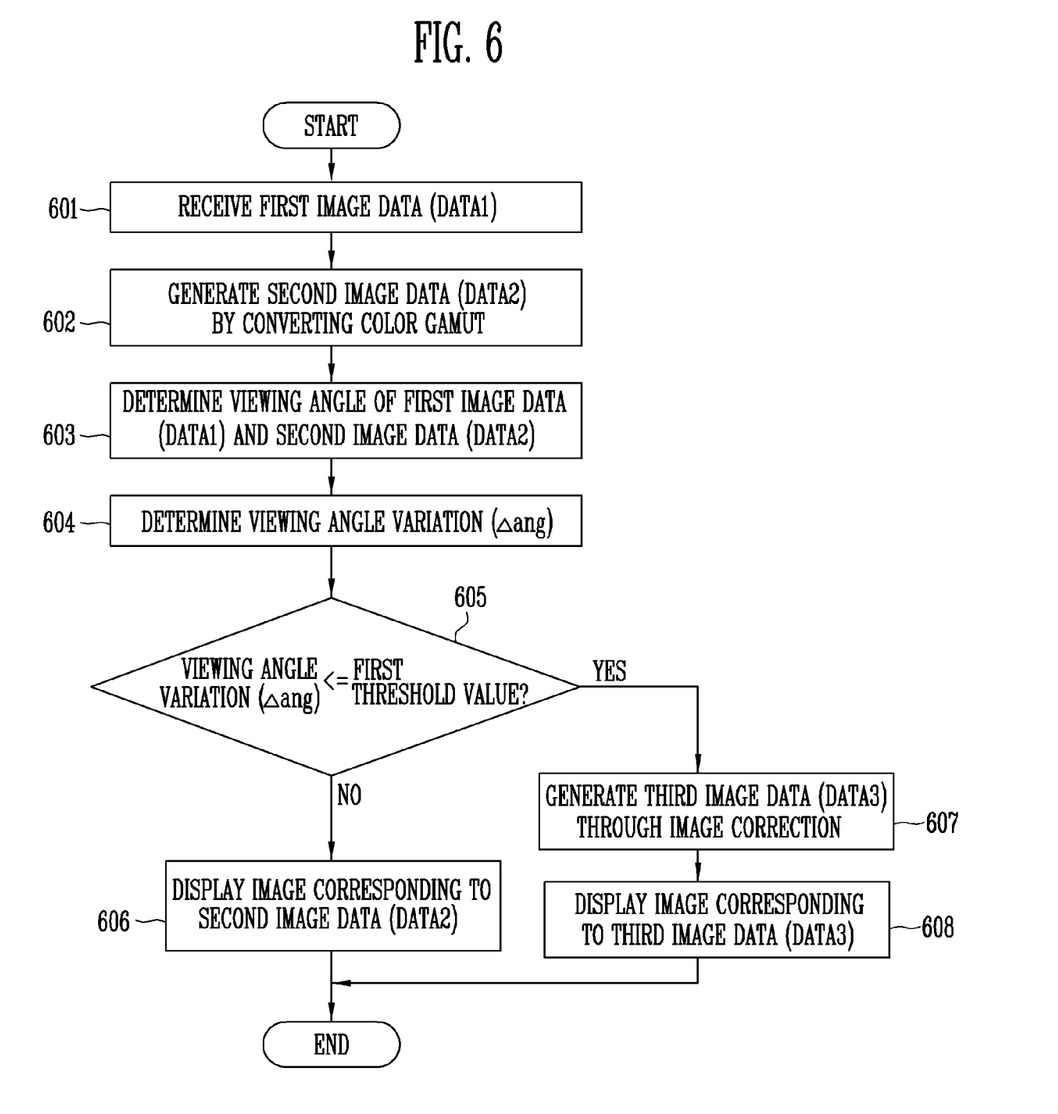
FIG. 6 is a flowchart illustrating a driving method of a display device according to the first embodiment of the invention.

FIG. 6 is a flowchart illustrating a driving method of a display device according to the first exemplary embodiment of the invention.

Referring to FIG. 6, first, the display device 100 may receive first image data DATA1 from an external host device or the like at step 601. The first image data DATA1 may include a red value, a green value, and a blue value corresponding to a color intended to be displayed using the first image data DATA1. In exemplary embodiments, the first image data DATA1 may include chromaticity coordinates, that is, an x-coordinate value and a y-coordinate value, corresponding to the color intended to be displayed. In exemplary embodiments, when the first image data DATA1 includes only a red value, a green value, and a blue value, the display device 100 may convert the red value, the green value, and the blue value into chromaticity coordinates.

Subsequently, the display device 100 may generate second image data DATA2 at step 602 by performing color gamut conversion for the first image data DATA1. The display device 100 may convert the first image data DATA1, which is generated based on a source color gamut, into second image data DATA2 in a target color gamut.

In exemplary embodiments, the display device 100 may perform color gamut conversion using a previously stored color gamut LUT. For example, the display device 100 may load chromaticity coordinates mapped to the chromaticity coordinates of the first image data DATA1 from the color gamut LUT and generate second image data DATA2 using the loaded chromaticity coordinates.

In exemplary embodiments, the display device 100 may generate second image data DATA2 by converting the loaded chromaticity coordinates into a red value, a green value, and a blue value.

Subsequently, the display device 100 may determine the viewing angles of the first image data DATA1 and the second image data DATA2 at step 603. For example, the display device 100 may determine the viewing angles of the first image data DATA1 and the second image data DATA2 using previously stored primary-color-viewing-angle data.

More specifically, the display device 100 may determine the chromaticity coordinates of the first image data DATA1 in a first viewing direction and a second viewing direction with reference to the primary-color-viewing-angle data. The display device 100 compares the chromaticity coordinates of the first image data DATA1 in the first viewing direction with those in the second viewing direction, thereby determining a change in the chromaticity coordinates ($\Delta u'v'\_45$) of the first image data DATA1. The display device 100 may use the determined change in the chromaticity coordinates ($\Delta u'v'\_45$) as the viewing angle of the first image data DATA1.

Similarly, the display device 100 may determine the chromaticity coordinates of the second image data DATA2 in the first viewing direction and the second viewing direction with reference to the primary-color-viewing-angle data. The display device 100 compares the chromaticity coordinates of the second image data DATA2 in the first viewing direction with those in the second viewing direction, thereby determining a change in the chromaticity coordinates ($\Delta u'v'\_45$) of the second image data DATA2. The display device 100 may use the determined change in the chromaticity coordinates ($\Delta u'v'\_45$) as the viewing angle of the second image data DATA2.

Subsequently, the display device 100 may determine the viewing angle variation ($\Delta ang$) between the first image data DATA1 and the second image data DATA2 at step 604. For example, the display device 100 may determine the viewing angle variation ($\Delta ang$) by comparing the change in the chromaticity coordinates ($\Delta u'v'\_45$) of the first image data DATA1 with the change in the chromaticity coordinates ($\Delta u'v'\_45$) of the second image data DATA2.

The display device 100 may determine at step 605 whether the determined viewing angle variation ($\Delta ang$) is equal to or less than (or is less than) a preset first threshold value.

When the viewing angle variation ($\Delta ang$) is determined to be greater than the first threshold value, the display device 100 may display an image corresponding to the second image data DATA2 at step 606.

When the viewing angle variation ($\Delta ang$) is determined to be equal to or less than the first threshold value, the display device 100 may generate third image data DATA3 at step 607 by correcting the first image data DATA1 or the second image data DATA2. In an exemplary embodiment, the display device 100 may change at least one of the red value, the green value, and the blue value of the first image data DATA1 or the second image data DATA2 such that the hue variation ($\Delta HUE$) between the hue of the first image data DATA1 and the hue of the third image data DATA3 is equal to or less than a preset second threshold value.

The display device 100 may display an image corresponding to the third image data DATA3, which is generated as described above, at step 608.

Figure 7:
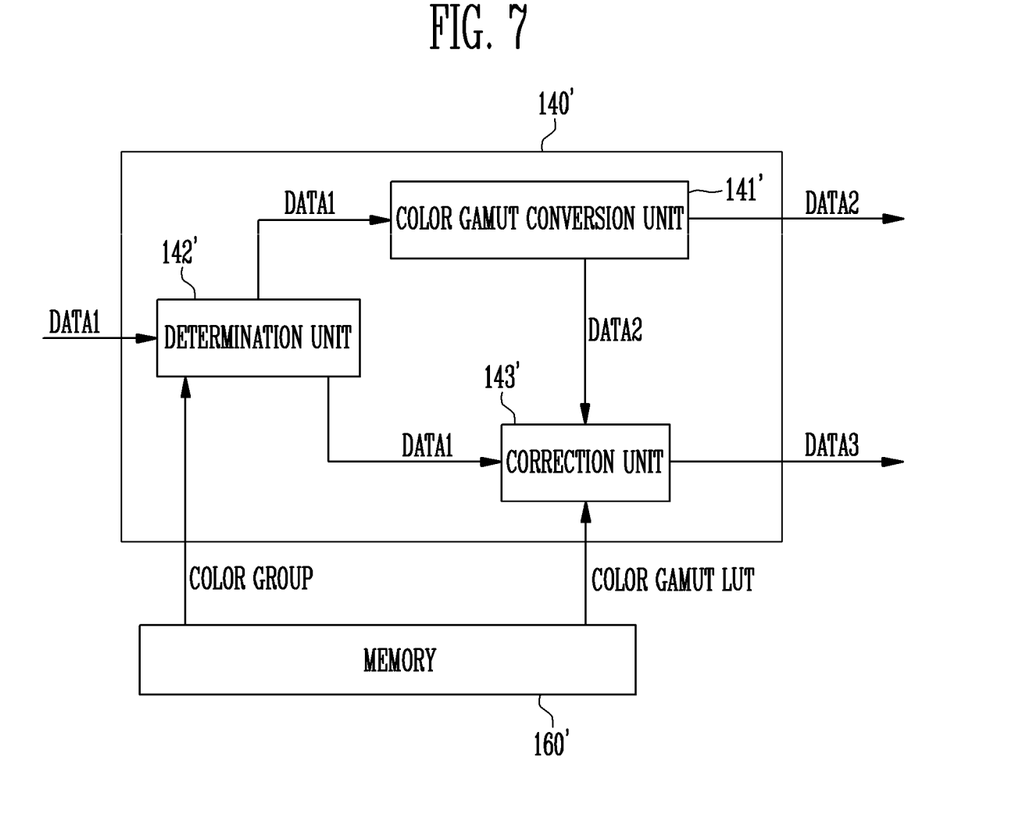
FIG. 7 is a block diagram illustrating the configuration of a color controller according to a second embodiment of the invention.

FIG. 7 is a block diagram illustrating the configuration of a color controller according to a second exemplary embodiment of the invention.

In the second exemplary embodiment of the invention, the memory 160' may store information about a group of colors that need to be corrected, rather than primary-color-viewing-angle data. Such information may include information about chromaticity coordinates (and/or the red value, the green value, and the blue value) of colors that need to be corrected because the viewing angles thereof are decreased through color gamut conversion.

Information about the group of colors that need to be corrected may be generated through a test for checking whether a viewing angle is decreased, that is, whether the correction of image data for an arbitrary color is required when the color gamut of the image data is converted into a target color gamut. If the correction of image data is required when color gamut conversion is applied to an arbitrary color, corrected chromaticity coordinates for the color may be mapped to the color and stored in a correction LUT. Here, the corrected chromaticity coordinates may be set such that the difference between the hue of the color and the hue of the corrected color is equal to or less than a preset threshold value.

In such an exemplary embodiment, image data configured with Macbeth colors may be used for the test for generating the correction LUT.

In an exemplary embodiment of the invention, the group of colors that need to be corrected may be stored in the memory 160', but in another exemplary embodiment, information thereabout may be received in real time from external memory or an AVI system.

Referring to FIG. 7, the color controller 140' according to the second exemplary embodiment of the invention may include a determination unit 142', a color gamut conversion unit 141' and a correction unit 143'.

The determination unit 142' may receive first image data from an external host device or via the timing controller 150. The first image data DATA1 may include a red value, a green value, and a blue value corresponding to a required color. The first image data may include chromaticity coordinates, that is, an x-coordinate value and a y-coordinate value, corresponding to the required color. In exemplary embodiments, when the first image data DATA1 includes only a red value, a green value, and a blue value, the determination unit 142' may convert the red value, the green value, and the blue value into chromaticity coordinates.

The determination unit 142' may determine whether it is necessary to correct the first image data DATA1 using previous stored color group information. That is, the determination unit 142' may determine whether the chromaticity coordinates of the first image data DATA1 are included in the previous stored color group information.

When it is determined that it is not necessary to correct the first image data DATA1, the determination unit 142' may transmit the first image data DATA1 to the color gamut conversion unit 141'. When it is determined that it is necessary to correct the first image data DATA1, the determination unit 142' may transmit the first image data DATA1 to the correction unit 143'.

As described above with reference to FIG. 1 and FIGS. 2A and 2B, the color gamut conversion unit 141' may convert the first image data DATA1, which is generated based on a source color gamut S, into second image data DATA2 in a target color gamut T. In exemplary embodiments, each of the source color gamut S and the target color gamut T may be any one of sRGB, scRGB, xvYCC, YCbCr, CIELAB, CIE-XYZ, and the like.

In exemplary embodiments, the color gamut conversion unit 141' may load chromaticity coordinates mapped to the chromaticity coordinates of the first image data DATA1 from a color gamut LUT stored in the memory 160' or the like, generate second image data DATA2 based on the loaded chromaticity coordinates, and output the second image data DATA2. In exemplary embodiments, the color gamut conversion unit 141' may generate second image data DATA2 by converting the loaded chromaticity coordinates into a red value, a green value, and a blue value.

The color gamut conversion unit 141' may output the generated second image data DATA2. In exemplary embodiments, the second image data DATA2 output from the color gamut conversion unit 141' may be transmitted to the timing controller 150 or the data driver 130.

The correction unit 143' may generate third image data DATA3 by correcting the first image data DATA1, transmitted from the determination unit 142', or the second image data DATA2, transmitted from the color gamut conversion unit 141'. In an exemplary embodiment, the correction unit 143' may change at least one of the red value, the green value, and the blue value of the first image data DATA1 or the second image data DATA2 such that the hue variation ($\Delta$HUE) between the hue of the first image data DATA1 and the hue of the third image data DATA3 is equal to or less than a preset threshold value.

The correction unit 143' may output the generated third image data DATA3. In exemplary embodiments, the third image data DATA3 output from the correction unit 143' may be transmitted to the timing controller 150 or the data driver 130.

The example in which the correction unit 143' itself determines the corrected chromaticity coordinates in consideration of the hue variation ($\Delta$HUE) has been described, but the inventive concepts are not limited thereto. That is, in other exemplary embodiments of the invention, the memory 160 may store a correction LUT in which a color that needs to be corrected is mapped to corrected chromaticity coordinates, and the correction unit 143' loads the corrected chromaticity coordinates corresponding to the chromaticity coordinates of image data from the correction LUT, thereby generating third image data DATA3 corresponding to corrected image data.

Figure 8:
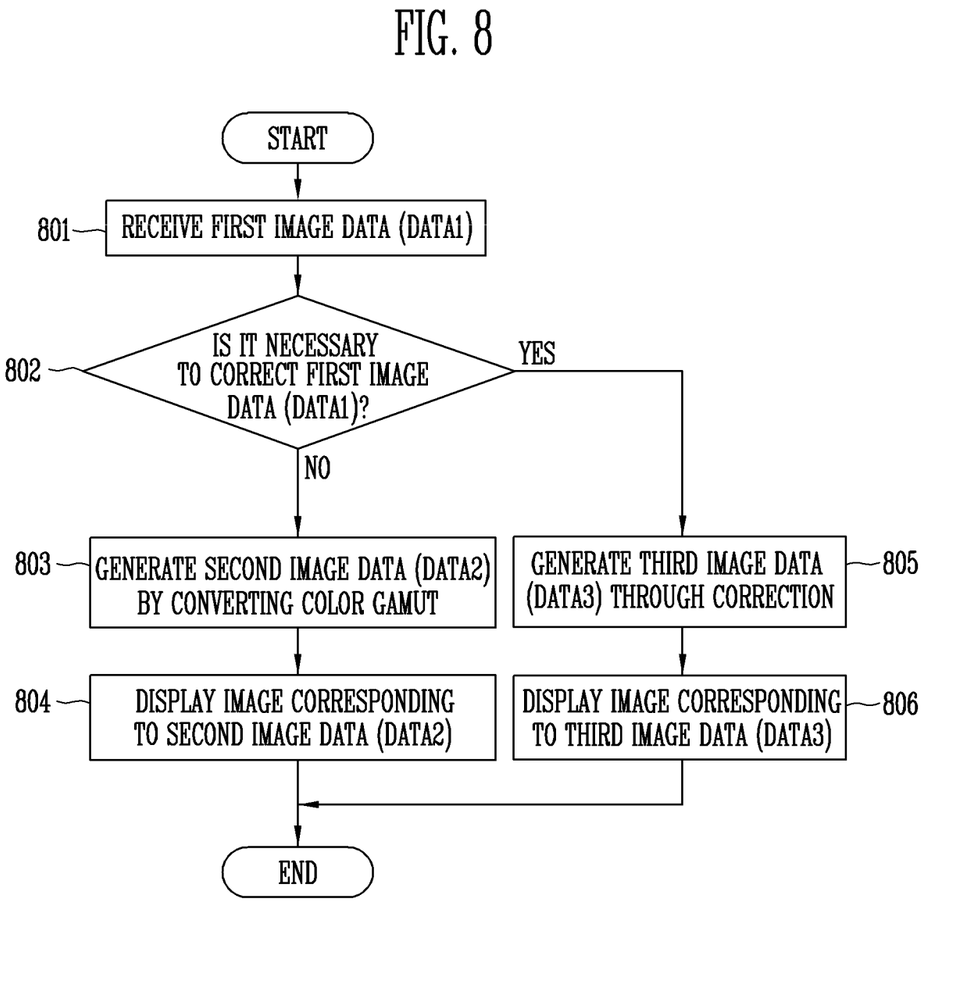
FIG. 8 is a flowchart illustrating a driving method of a display device according to the second embodiment of the invention.

FIG. 8 is a flowchart illustrating a driving method of a display device according to the second exemplary embodiment of the invention.

Referring to FIG. 8, the display device 100 may receive first image data DATA1 from an external host device or the like at step 801.

The first image data DATA1 may include a red value, a green value, and a blue value corresponding to a color intended to be displayed through the first image data DATA1. In exemplary embodiments, the first image data DATA1 may include chromaticity coordinates, that is, an x-coordinate value and a y-coordinate value, corresponding to the color that is intended to be displayed. In exemplary embodiments, when the first image data DATA1 includes only a red value, a green value, and a blue value, the display device 100 may convert the red value, the green value, and the blue value into chromaticity coordinates.

Subsequently, the display device 100 may determine whether it is necessary to correct the first image data DATA1 at step 802. The display device 100 may determine whether it is necessary to correct the first image data DATA1 using previous stored color group information. That is, the display device 100 may determine whether the chromaticity coordinates of the first image data DATA1 are included in the previous stored color group information.

When it is determined that it is not necessary to correct the first image data DATA1, the display device 100 may generate second image data DATA2 at step 803 by performing color gamut conversion for the first image data DATA1. The display device 100 may convert the first image data DATA1, which is generated based on a source color gamut, into second image data DATA2 in a target color gamut.

In exemplary embodiments, the display device 100 may perform color gamut conversion using a previous stored color gamut LUT. For example, the display device 100 may load chromaticity coordinates mapped to the chromaticity coordinates of the first image data DATA1 from the color gamut LUT and generate second image data DATA2 using the loaded chromaticity coordinates.

In an exemplary embodiment, the display device 100 may generate second image data DATA2 by converting the loaded chromaticity coordinates into a red value, a green value, and a blue value.

When the second image data DATA2 is generated, the display device 100 may display an image corresponding to the second image data DATA2 at step 804.

When it is determined that it is necessary to correct the first image data DATA1, the display device 100 may generate third image data DATA3 at step 805 by correcting the first image data DATA1 or the second image data DATA2. In an exemplary embodiment, the display device 100 may change at least one of the red value, the green value, and the blue value of the first image data DATA1 or the second image data DATA2 such that the hue variation ($\Delta$HUE) between the hue of the first image data DATA1 and the hue of the third image data DATA3 is equal to or less than a preset second threshold value.

When the third image data DATA3 is generated, the display device 100 may display an image corresponding to the third image data DATA3 at step 806.

A display device and a driving method thereof according to the invention may improve a viewing angle for a color, the viewing angle of which is decreased when a color gamut is converted.

A display device and a driving method thereof according to the invention improve a viewing angle, whereby color distortion may be prevented and accurate color may be represented for a more wide viewing angle.

Although certain exemplary embodiments and implementations have been described herein, other embodiments and modifications will be apparent from this description. Accordingly, the inventive concepts are not limited to such embodiments, but rather to the broader scope of the appended claims and various obvious modifications and equivalent arrangements as would be apparent to a person of ordinary skill in the art.

What is claimed is:

1. A display device, comprising:
   a color controller configured to generate second image data by converting a color gamut of first image data received from an outside and to generate third image data by correcting the first image data or the second image data depending on a viewing angle variation between the first image data and the second image data; and
   a display panel configured to display an image based on the second image data or the third image data.

2. The display device according to claim 1, wherein:
   the color controller determines a first viewing angle of the first image data and a second viewing angle of the second image data based on primary-color-viewing-angle data and determines the viewing angle variation based on a difference between the first viewing angle and the second viewing angle; and
   the primary-color-viewing-angle data includes chromaticity coordinates of each of multiple primary colors for the display panel in a first viewing direction and chromaticity coordinates thereof in a second viewing direction.

3. The display device according to claim 2, wherein the color controller determines first chromaticity coordinates of a color corresponding to arbitrary image data in the first viewing direction and second chromaticity coordinates thereof in the second viewing direction based on the primary-color-viewing-angle data and determines a viewing angle of the image data based on a difference between the first chromaticity coordinates and the second chromaticity coordinates.

4. The display device according to claim 3, wherein the color controller determines the first chromaticity coordinates in the first viewing direction and the second chromaticity coordinates in the second viewing direction based on the primary-color-viewing-angle data using a preset conversion equation.

5. The display device according to claim 3, wherein the first viewing direction is a direction to face a measuring point on the display panel, and the second viewing direction is a tilted direction from the first viewing direction with reference to the measuring point.

6. The display device according to claim 2, wherein the color controller generates the third image data by correcting the first image data when the viewing angle variation is less than a first threshold value.

7. The display device according to claim 6, wherein the color controller generates the third image data by correcting chromaticity coordinates of the first image data or the second image data such that a hue variation between a hue of the first image data and a hue of the third image data are equal to or less than a second threshold value.

8. The display device according to claim 1, wherein:
   the color controller determines whether it is necessary to correct image data based on previously stored color group information; and
   the color group information includes information about at least one color, of which a viewing angle variation caused by converting a color gamut is less than a first threshold value.

9. The display device according to claim 8, wherein the color controller generates the third image data by correcting the first image data or the second image data when a color corresponding to the first image data is included in the color group information.

10. The display device according to claim 1, wherein the display panel is configured to display the image based on the second image data when the third image data is not generated by the color controller, and display the image based on the third image data when the third image data is generated by the color controller.

11. A driving method of a display device, comprising:
    generating second image data by converting a color gamut of first image data received from an outside;
    determining whether image data correction is required depending on a viewing angle variation between the first image data and the second image data;
    generating third image data by correcting the first image data or the second image data depending on a result of determination; and
    displaying an image based on the second image data or the third image data.

12. The driving method of claim 11, wherein determining whether the image data correction is required comprises:
    determining a first viewing angle of the first image data and a second viewing angle of the second image data based on primary-color-viewing-angle data; and
    determining the viewing angle variation based on a difference between the first viewing angle and the second viewing angle,
    wherein the primary-color-viewing-angle data includes chromaticity coordinates of each of multiple primary colors in a first viewing direction and chromaticity coordinates thereof in a second viewing direction.

13. The driving method according to claim 12, wherein determining the first viewing angle and the second viewing angle comprises:
    determining first chromaticity coordinates of a color corresponding to the first image data in the first viewing direction and second chromaticity coordinates thereof in the second viewing direction based on the primary-color-viewing-angle data;
    determining a viewing angle of the first image data based on a difference between the first chromaticity coordinates and the second chromaticity coordinates;
    determining third chromaticity coordinates of a color corresponding to the second image data in the first viewing direction and fourth chromaticity coordinates thereof in the second viewing direction based on the primary-color-viewing-angle data; and
    determining a viewing angle of the second image data based on a difference between the third chromaticity coordinates and the fourth chromaticity coordinates.

14. The driving method according to claim 13, wherein the first to fourth chromaticity coordinates are determined based on the primary-color-viewing-angle data using a preset conversion equation.

15. The driving method according to claim 13, wherein the first viewing direction is a direction to face a measuring point on a display panel of the display device, and the second viewing direction is a tilted direction from the first viewing direction with reference to the measuring point.

16. The driving method according to claim 12, wherein generating the third image data comprises:
   comparing the viewing angle variation with a first threshold value; and
   generating the third image data by correcting the first image data when the viewing angle variation is less than the first threshold value.

17. The driving method according to claim 16, wherein generating the third image data comprises:
   correcting chromaticity coordinates of the first image data or the second image data such that a hue of the first image data and a hue of the third image data are equal to or less than a second threshold value.

18. The driving method according to claim 11, wherein determining whether the image data correction is required comprises:
   determining whether a color corresponding to the first image data is included in previously stored color group information; and
   determining that the image data correction is required when the color corresponding to the first image data is included in the previously stored color group information.

19. The driving method according to claim 18, wherein the color group information includes information about at least one color, of which a viewing angle variation caused by converting a color gamut is less than a first threshold value.

20. The driving method according to claim 11, wherein displaying the image comprises:
   displaying the image based on the second image data when the third image data is not generated; and
   displaying the image based on the third image data when the third image data is generated.

* * * * *